United States Patent
Hashimoto

(10) Patent No.: US 7,778,947 B2
(45) Date of Patent: Aug. 17, 2010

(54) ANOMALY MONITORING DEVICE USING TWO COMPETITIVE NEURAL NETWORKS

(75) Inventor: Yoshihito Hashimoto, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 595 days.

(21) Appl. No.: 11/882,480

(22) Filed: Aug. 2, 2007

(65) Prior Publication Data
US 2008/0033898 A1  Feb. 7, 2008

(30) Foreign Application Priority Data
Aug. 3, 2006  (JP) .............................. 2006-212435

(51) Int. Cl.
*G06E 1/00* (2006.01)
(52) U.S. Cl. ........................................................ 706/20
(58) Field of Classification Search ................... 706/15, 706/19–27; 702/183–185
See application file for complete search history.

(56) References Cited

U.S. PATENT DOCUMENTS

| | | | | |
|---|---|---|---|---|
| 5,904,215 A | * | 5/1999 | Ikeda | 180/169 |
| 6,198,843 B1 | * | 3/2001 | Nakauchi et al. | 382/167 |
| 6,275,761 B1 | * | 8/2001 | Ting | 701/59 |
| 2002/0161914 A1 | * | 10/2002 | Belenki | 709/235 |
| 2006/0122810 A1 | * | 6/2006 | Clarke et al. | 702/185 |

FOREIGN PATENT DOCUMENTS

JP  2002-245434  8/2002

OTHER PUBLICATIONS

Masahiro Michihata, Journal of Japan Society for Fuzzy Theory and Systems, Japan Society for Fuzzy Theory and Intelligent Informatics 14(2) pp. 148, line 38~pp. 151, line 50, Apr. 15, 2002.

* cited by examiner

*Primary Examiner*—David R Vincent
(74) *Attorney, Agent, or Firm*—Bacon & Thomas, PLLC

(57) ABSTRACT

An anomaly monitoring device includes two neural networks which are switchable between a training mode by using training samples and a checking mode for classifying, based on a training result, whether an amount of characteristics obtained by an operation of an apparatus indicates that the operation of an apparatus is normal and a mode switching unit controlling one of the neural networks to operate in training mode and the other neural network to operate in the checking mode. Further, the anomaly monitoring device includes a switching determining unit computing a judgment evaluation value serving to evaluate reliability of a judgment result of the other neural network operating in the checking mode, and for instructing the mode switching unit to have the one of the neural networks operate in the checking mode and the other neural network operate in training mode when the judgment evaluation value does not meet evaluation criteria.

2 Claims, 4 Drawing Sheets

ANOMALY MONITORING DEVICE USING TWO COMPETITIVE NEURAL NETWORKS

FIELD OF THE INVENTION

The present invention relates to an anomaly monitoring device for determining whether an apparatus is operating normally by using a neural network which classifies an amount of characteristic extracted from a target signal generated by the operating apparatus.

BACKGROUND OF THE INVENTION

Conventionally, there has been proposed an anomaly monitoring device for determining whether an apparatus is operating normally by using a classification function of a neural network (neuro-computer). For such an anomaly monitoring device, there exist various techniques in which an operation sounds or a vibration of an apparatus is converted to an electric signal by a sensor (transducer) to be used as a target signal, and an amount of characteristics with a plurality of parameters is extracted from the target signal to be classified by a neural network.

Various configurations of neural networks are known. For example, there has been proposed a competitive learning neural network (Self-Organizing Map (SOM)) which classifies a variety of amounts of characteristics into categories. The competitive learning neural network is a neural network having two layers, i.e., an input layer and an output layer, and having two modes of operation, a training mode and a checking mode.

In the training mode, training samples are given to the network, which is trained using an unsupervised learning scheme. If training samples are assigned with categories, neurons of an output layer can be associated with the categories clusters each including neurons of a like category can be formed. Therefore, in the training mode, a clustering map representing categories can be matched to clusters of neurons in the output layer.

In the checking mode, an amount of characteristics (input data) to be classified is given to the competitive learning neural network which completed the training process and the category of a cluster to which an excited neuron belong to is mapped with the clustering map so that the category of the input data can be classified (see, e.g., Japanese Patent Laid-open Application No. 2004-354111).

However, it takes long time to collect training samples corresponding to the anomaly of an apparatus since they are obtained only if the apparatus operates abnormally. Therefore, it has been proposed that only normal categories are created in the clustering map by using, as training samples, amounts of characteristics obtained from an apparatus which operates properly, and anomaly is detected when deviating from the normal categories.

However, an apparatus such as an air conditioner operates differently in summer and in winter. That is, there is a big change in target signals of summer and winter even if the apparatus operates normally. In such an apparatus, there are great differences in cluster locations depending on whether the apparatus has been trained in summer or winter. Therefore, if a clustering map produced in summer is used in winter for example, misjudgment is likely to occur.

SUMMARY OF THE INVENTION

Therefore, the present invention provides an anomaly monitoring device capable of avoiding misjudgments in determining normality/abnormality even in case of using an apparatus generating a target signal having a temporally varying amount of characteristics.

In accordance with an embodiment of the present invention, there is provided an anomaly monitoring device includes: a signal input unit for receiving a target signal generated by an operation of an apparatus; a characteristics extraction unit for extracting an amount of characteristics having a plurality of parameters from the target signal; two competitive learning neural networks each of which are switchable between a training mode for learning by using amounts of characteristics extracted from the characteristics extraction unit as training samples and a checking mode for classifying based on a training result from the training mode whether or not the amount of characteristics indicates that the operation of the apparatus is normal; and a output selecting unit for generating a classification result of the competitive learning neural networks. The anomaly monitoring device further includes a mode switching unit for operating each competitive learning neural network in one of the training mode and the checking mode wherein the neural networks operate in modes different from each other; and a switching determining unit for computing a judgment evaluation value serving to evaluate reliability of a judgment result of one of the competitive learning neural networks operating in the checking mode, and for instructing the mode switching unit to have said one of the competitive learning neural networks operate in the training mode and the other competitive learning neural network operate in the checking mode when the judgment evaluation value does not meet evaluation criteria.

In accordance with the embodiment of the present invention using two competitive learning neural networks, while one of the competitive neural networks judges whether the apparatus normally operates or not based on an amount of characteristics obtained while the apparatus operates and the other competitive learning neural network is trained by using the same amount of characteristics. Further, when the judgment result of one of the competitive learning neural networks becomes less reliable due to time-varying operation of the apparatus, operation modes of each competitive learning neural network is switched such that the judgment is carried out by the other competitive learning neural network. Accordingly, when one of the competitive learning neural networks does not operate properly that the normal operation of the apparatus can be misjudged as being abnormal due to time-varying operation of the apparatus, proper judgment can be made by the other competitive learning neural network. Therefore, appropriate classification is always possible in harmony with the time-varying operation of the apparatus.

It is preferable that the switching determining unit allows the amount of characteristics to be used, as a training sample for the other competitive learning neural network operating in the training mode, only when the judgment result from said one of the competitive learning neural network operating in the checking mode is normal and meets the evaluation criteria.

In this configuration, the training samples to be given to the competitive learning neural network operating in the training mode are selected considering the judgment results of the competitive learning neural network operating in the checking mode. As a result, a probability of learning from inappropriate training samples can be reduced and reliability of judgment results can be enhanced when the training mode is switched to the checking mode.

In accordance with the embodiment of the present invention using two competitive learning neural networks and having one of the competitive learning neural networks operate in the training mode and the other competitive learning neural network operate in the checking mode. Accordingly, appropriate judgment is always possible in harmony with the time-varying operation of the apparatus. Therefore, the anomaly monitoring device is capable of avoiding misjudgments in determining normality/anomaly even in case of using an apparatus generating a target signal having a temporally varying amount of characteristics.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Embodiments described below can be advantageously applied to the case that an amount of characteristics of a target signal generated by an operation of an apparatus varies with time rather gradually. Here, the term "gradually" means that the change does not occur abruptly, so that a time unit of the variation is insignificant. Therefore, the temporal variation may be the one taking place per day, week, month, season, year, or the like. Moreover, a conditioner is used as an apparatus in the embodiments, but a kind of an apparatus is not limited thereto.

Figure 1:
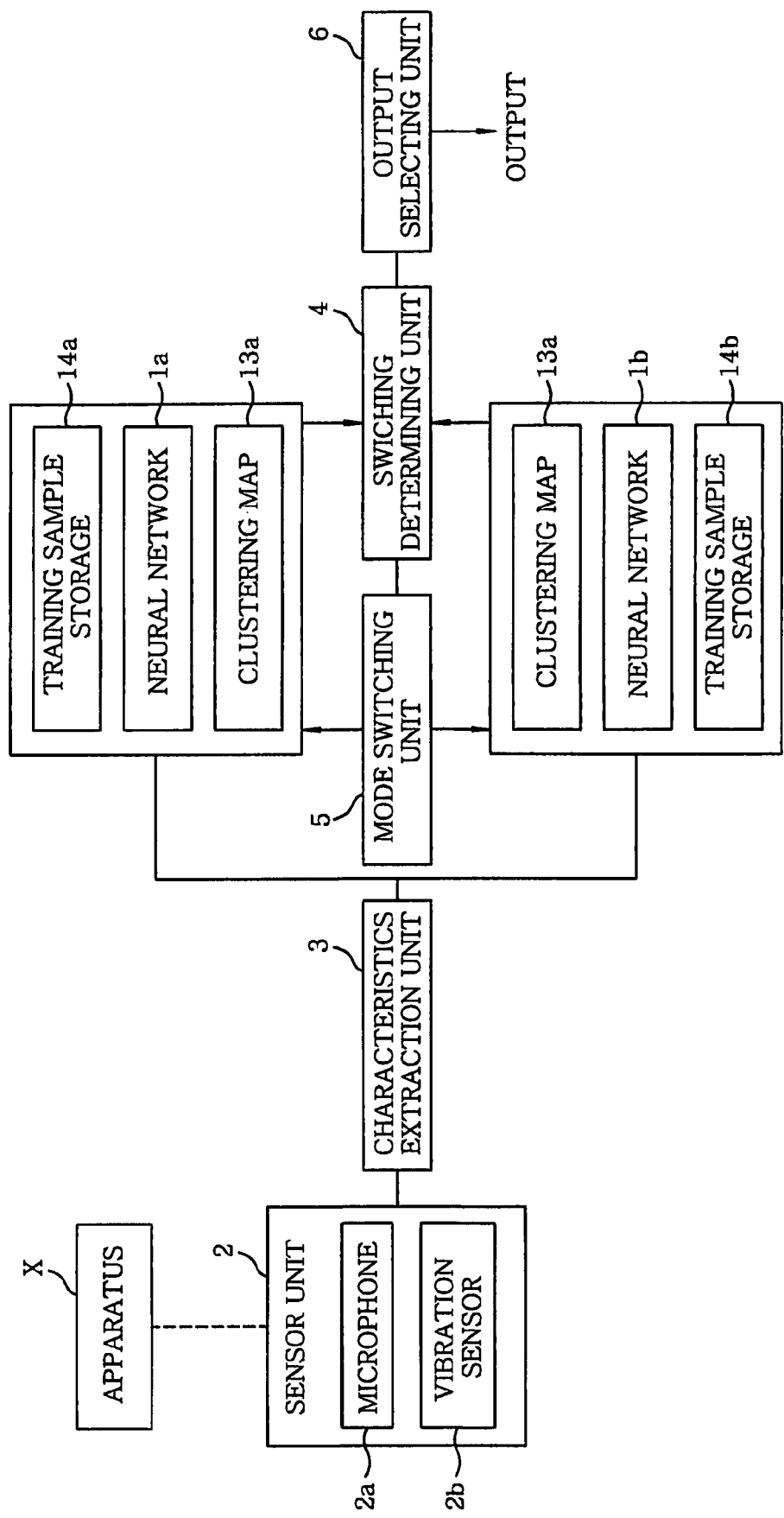
FIG. 1 is a block diagram showing an embodiment in the present invention.
Figure 2:
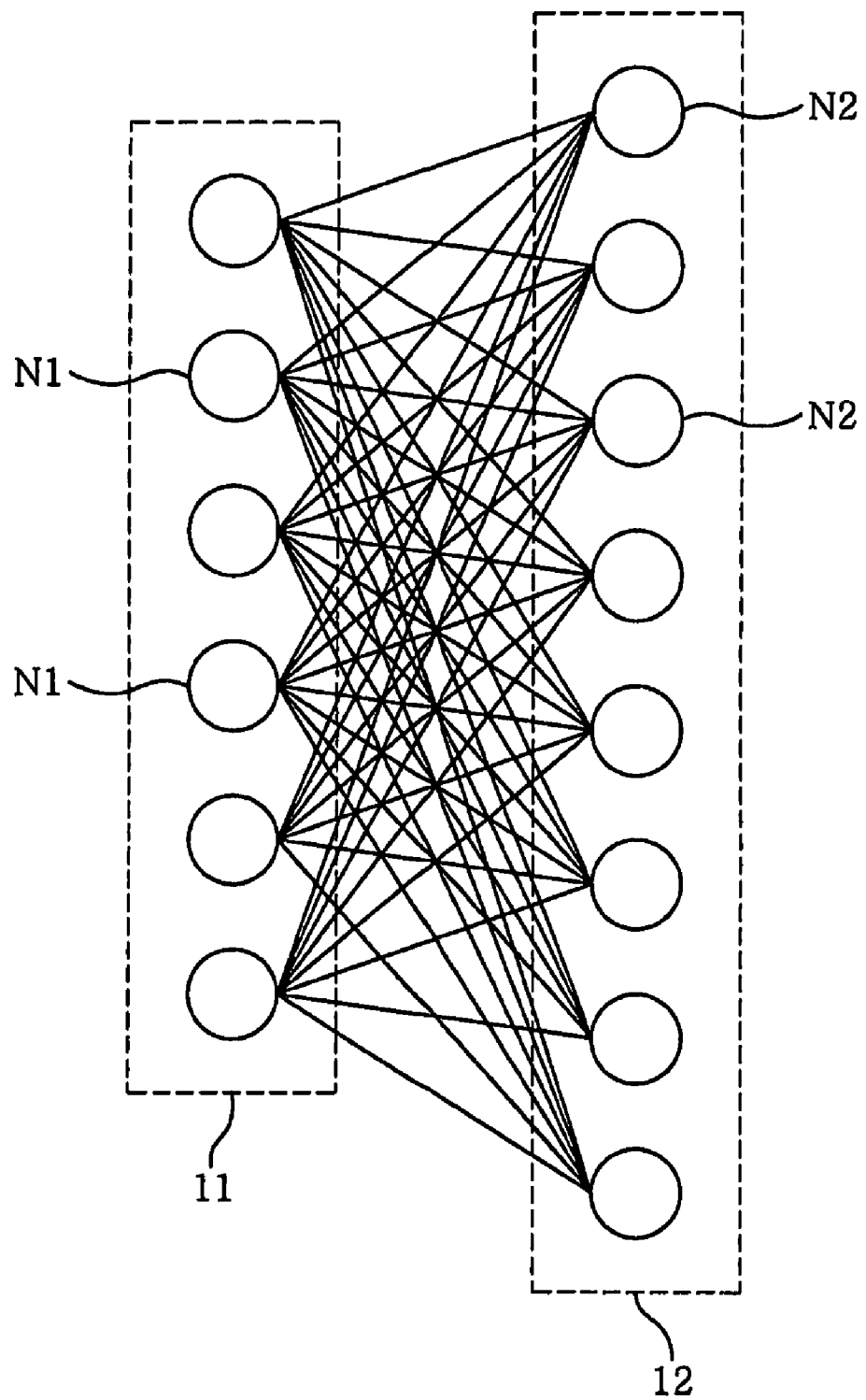
FIG. 2 illustrates a schematic configuration of a neural network used in the embodiment in FIG. 1.

As shown in FIG. 1, an anomaly monitoring device described in the present embodiment uses two unsupervised competitive learning neural networks (hereinafter, simply referred to as neural networks) 1. As shown in FIG. 2, each of the neural networks 1 has two layers of an input layer and an output layer and is configured such that every neuron N2 of the output layer 12 is connected to all neurons N1 of the input layer 11. In the embodiment, the neural networks 1 may be executed by an application program running at a sequential processing type computer, but a dedicated neuro-computer may be used.

Each of the neural networks 1 has two modes of operations, i.e., a training mode and a checking (or checking) mode as described in section of the Background of the Invention. After learning through proper training samples in the training mode, an amount of characteristics (input data) generated from an actual target signal is classified into a category in the checking mode.

That is, a coupling degree (weight coefficients) of the neurons N1 of the input layer 11 and the neurons N2 of the output layer 12 is variable. In the training mode, the neural networks 1 are trained through inputting training sample to the neural networks 1 so that respective weight coefficients of the neurons N1 of the input layer 11 and the neurons N2 of the output layer 12 are decided. In other words, every neuron N2 of the output layer 12 is assigned with a weight vector having weight coefficients associated with all the neurons N1 of the input layer 11 as elements of the weight vector. Therefore, the weight vector has same number of elements as, the number of neurons N1 in the input layer 11 and the number of parameters of the amount of characteristics inputted to the input layer 11 is equal to the number of the elements of the weight vector.

Meanwhile, in the checking mode, when input data whose category is to be decided is given to the input layer 11 of the neural network 1, a neuron lying closest to the input data, i.e., a neuron having the shortest Euclidean distance between the its weight vector and the input data, is excited among the neurons N2 of the output layer 12. If categories are assigned to the neurons N2 of the output layer 12 in the training mode, a category of the input data can be recognized through a category of a location of the excited neuron N2.

The neurons N2 of the output layer 12 are associated with zones of each of two-dimensional clustering maps 13 having 6*6 zones for example in one-to-one correspondence. Therefore, if categories of the training samples are associated with the zones of the clustering maps 13, a category corresponding to a neuron N2 excited by input data can be recognized through the clustering maps 13. Thus, the clustering maps 13 can function as a output unit for outputting a classified result.

When associating categories with the zones of the clustering maps 13 (actually the neurons N2 of the output layer 12), a trained neural network 1 is operated in the reverse direction from the output layer 12 to the input layer 11 to estimate data assigned to the input layer 11 for every neuron N2 of the output layer 12. A category of a training sample having the shortest Euclidean distance with respect to the estimated data is used as a category of a corresponding neuron N2 in the output layer 12.

In other word, a category of a training sample having the shortest Euclid distance with respect to a weight vector of a neuron N2 is used for a category of the corresponding neuron N2 of the output layer 12. As a result, the categories of the training samples are reflected to the categories of the neurons N2 of the output layer 12. Further, if a large number of training samples (for example, 150 samples) are employed, categories having similar attributes are arranged close together in the clustering maps 13.

As a result, the neurons N2 excited from the neurons N2 of the output layer 12 in response to training samples belonging to a like category form a cluster formed of a group of neurons N2 residing close together in the clustering maps 13. The training samples given to the neural networks 1 operating in the training mode are stored in a training sample storage 14 and retrieved therefrom to be used in the neural network 1 when necessary.

A target signal to be classified by the neural network 1 is an electric signal obtained from an apparatus X; and an output of a sensor unit 2 including at least one of a microphone 2a for detecting operation sound of the apparatus X and a vibration sensor 2b for detecting vibration generated by the operation of the apparatus X is used therefor. A configuration of the sensor unit 2 is properly selected according to an apparatus X such that in addition to the microphone 2a and the vibration sensor 2b, various sensors such as a TV camera and an olfactory sensor can be used individually or in combination. Further, output signal generated fromm the apparatus X can be used as the target signal. The sensor unit 2 functions as a signal input unit since it receives the target signal generated by the operation of the apparatus X.

The electrical target signal obtained from the sensor unit 2 is transmitted to the characteristics extraction unit 3 which extracts an amount of characteristics therefrom. In the present embodiment, the target signal given to the characteristics extraction unit 3 by the sensor unit 2 contains vibration components, so that when the characteristics extraction unit 3 receives them, an amount of characteristics of various kinds is representing the vibration components of the target signal is extracted therefrom.

In order to extract an amount of characteristics from a target signal generated from an apparatus X in a same condition, the characteristics extraction unit 3 performs dividing the target signal (segmentation) by using timing signal (trigger signal) synchronous with the operation of the apparatus X or by using wave characteristics of the target signal (for example, a start point and an end point of one bundle of the target signal), thereby generating signals sampled every proper unit time and extracting an amount of characteristics for every unit time. Therefore, the characteristics extraction unit 3 has a buffer for temporary storing target signals outputted from the sensor unit 2. Further, the characteristics extraction unit 3 performs for example a pre-processing to reduce noises by restricting frequency band, if necessary. Further, the characteristics extraction unit 3 has a function for converting the target signal outputted from the sensor unit 2 to a digital signal.

For the sake of simple description, it is assumed that a plurality of frequency components (power of every frequency band) are extracted from vibration components of the segmented target signal and each frequency component is used as the amount of characteristics. FFT (Fast Fourier Transform) or a filter bank having a plurality of bandpass filters may be used in extracting the frequency components. Which frequency component is used as the amount of characteristics is decided depending on the type of the target apparatus X or anomalies to be detected.

Amounts of characteristics gained from the characteristics extraction unit 3 at every unit time are provided to both the neural networks 1 whenever amounts of characteristics are extracted. Further, the amounts of characteristics are also stored in training sample storages 14 since they can also be used as the training samples as described later. The training sample storages 14 are, e.g., FIFOs (first in first out) each maintaining a certain number of, e.g., 150, the amounts of characteristics as the training samples.

In the neural networks 1 in accordance with the present embodiment, only normal categories are established in the training mode. Declared by the neural networks 1 is "abnormal" when a neuron N2 of the output layer 12 excited by the input data in the checking mode does not belong to normal categories and a specific condition (for example, a condition that Euclidean distances with respect to the neurons N2 belonging to the normal categories exceed a threshold value) is satisfied. Further, in the checking mode, when a neuron N2 of the output layer 12 excited by the input data does not belong to the normal categories and the specific condition is not satisfied, "grey (or uncertain)" which cannot be determined as being "normal" or "abnormal" is judged.

The two neural networks 1 do not operate in the checking mode at the same time. When one of the neural networks 1 is in the checking mode, the other neural network 1 is in the training mode; and two neural networks 1 are configured such that they repeat the training mode and the checking mode alternatively. A mode switching unit 5 serves to switch operations of the neural networks 1 in response to instructions of a switching determining unit 4 and controls each of the neural networks 1 to operate in the training mode or the checking mode.

The switching determining unit 4 computes a judgment evaluation value based on the judgment result of the neural network 1 operating in the checking mode. When the judgment evaluation value satisfies a specific condition, the switching determining unit 4 instructs the mode switching unit 5 to switch an operation mode of each of the neural networks 1. The judgment evaluation value is for evaluating reliability of judgment result of the neural network 1 operating in the checking mode. At least one of the number of judgments declaring "abnormal", deviation, and adequacy is used for the judgment evaluation value. The judgment evaluation value and evaluating criteria of the switching determining unit 4 will be described later.

The neural network 1 operating in the checking mode is evaluated by using the judgment evaluation value. When it is judged based on the judgment evaluation value that judgment results become less reliable, the neural network 1 in the checking mode is switched to be in the training mode. Meanwhile, the neural network 1 which has been in the training mode until then is switched to be in the checking mode. The output of the neural networks 1 is outputted through an output selecting unit 6. The output selecting unit 6 is controlled by the switching determining unit 4 to select the output of the neural network 1 operating in the checking mode. It is preferable that the output provided via the output selecting unit 6 is for states with respect to all neurons N2 in the output layer 12, but the output may be a category corresponding to the location of an excited neuron N2.

The amount of characteristics obtained from the characteristics extraction unit 3 is used as input data in the checking mode. However, same is used as a training sample in the training mode. A category at this time is regarded as a normal category. As a result, if the amounts of characteristics are varied with time, the training samples are also varied. Therefore, in the neural network 1 operating in the training mode, locations of the excited neurons N2 leading to the judgments of "normal" also vary with time accompanied by the time-varying amounts of characteristics.

That is, if the neural network 1 operating in the training mode is switched to be in the checking mode, when the judgment results obtained from the neural network 1 operating in the checking mode become less reliable accompanying by the time-varying amounts of characteristics judgment results with high reliability can be obtained. When an amount of characteristics is abruptly varied with time due to the malfunctioning of the apparatus X, the judgment results of the neural network 1 may be largely deviated from the normal categories, so that anomaly can be detected in the checking mode.

In the neural network 1 operating in the training, the weight vectors vary gradually. For example, even in case where about one out of five training samples matched to the normal categories is not a proper training sample, the weight vectors vary little without changing abruptly. Therefore, in case of a normally operating apparatus, the weight vectors are gradually changed following the amounts of characteristics of target signals which also gradually vary with time. As a result, a target signal obtained at the time of switching from the training mode to the checking mode can be judged to be of the normal categories.

Deviation (Y) to be used in the judgment evaluation value is a normalized inner product of the difference between the input data (vector) used in the checking mode and the weight vector of the neuron excited by the corresponding input data and is defined as:

$$Y=([x]/x-[W\text{win}]/W\text{win})T([x]/x-[W\text{win}]/W\text{win}),$$

where [X] is the input data; [Wwin] is the weight vector of excited neuron ([a] represents that "a" is a vector); T represents transpose, and X and Wwin which are not bracketed represent norms of the respective vectors.

Adequacy (G) is defined by the input data [X] in the checking mode, the weight vector [Wi] of the neurons in output layer, and the standard deviation a of the weight vectors of the neurons in the output layer, as:

$$G=\Sigma gi$$

$$gi=\exp(-Z/2\sigma^2)$$

$$Z=([x]/x-[Wi]/Wi)T([x]/x-[Wi]/Wi) \text{ with i being 1 to N.}$$

In case the number of judgments which have determined as being "abnormal" is used as the judgment evaluation value, switching instruction is given to the mode switching unit 5 and the output selecting unit 6 when one or more of the following judgment conditions are satisfied. That is, the switching instruction is given to the mode switching unit 5 and the output selecting unit 6 when reliability is deteriorated and the judgment evaluation value does not meet the evaluation criteria:

(1) The number of misjudgments counted by the switching determining unit 4 exceeds a threshold, wherein whether a judgment of "abnormal" is right or not is determined by a person and the determination result is given to the switching determining unit 4.

(2) The number of judgment of "abnormal" exceeds a threshold.

(3) A ratio of the number of judgment of "abnormal" to the given number of total judgments exceeds a threshold.

Further, in case of using the deviation as the judgment evaluation value, the switching instruction is given to the mode switching unit 5 and the output selecting unit 6 when one or more of the following judgment conditions are satisfied:

(4) Sum of the deviations in the judgments of a given number exceeds a threshold value.

(5) A maximum value of the deviations in the judgments of a given number exceeds a threshold value.

In case of using the adequacy as the judgment evaluation value, the switching instruction is given to the mode switching unit 5 and the output selecting unit 6 when one or more of the following judgment conditions are satisfied:

(6) Sum of the adequacies in the judgments of a given number is less than a threshold value.

(7) A minimum value of the adequacies in the judgments of a given number is less than a threshold value.

In case of using both the adequacies and the deviations as the judgment evaluation value, the switching instruction is given to the mode switching unit 5 and the output selecting unit 6 when one or both of the following judgment conditions are satisfied:

(8) The number of times that the deviation satisfies any one of the conditions (4) and (5) and, concurrently, the adequacy satisfies any one of the conditions (6) and (7) exceeds a threshold number.

(9) The number of times that deviations successively satisfy any one of the conditions (4) and (5), and, concurrently, adequacies successively satisfy any one of the conditions (6) and (7) reaches a threshold number.

The aforementioned judgment conditions are only for examples, so that other conditions can be used as the judgment condition for the judgment evaluation value. Further, the following values, for example, can be employed as the aforementioned threshold values serving as the evaluating criteria:

(1) mean of deviations or adequacies with respect to all training samples.

(2) (mean + standard deviation) of deviations or adequacies with respect to all training samples.

(3) (mean − standard deviation) of deviations or adequacies with respect to all training samples.

(4) mean of deviations or adequacies excluding upper 5% and lower 5% with respect to all training samples.

(5) (mean + standard deviation) of deviations or adequacies excluding upper 5% and lower 5% with respect to all training samples.

(6) (mean − standard deviation) of deviations or adequacies excluding upper 5% and lower 5% with respect to all training samples.

Figure 3:
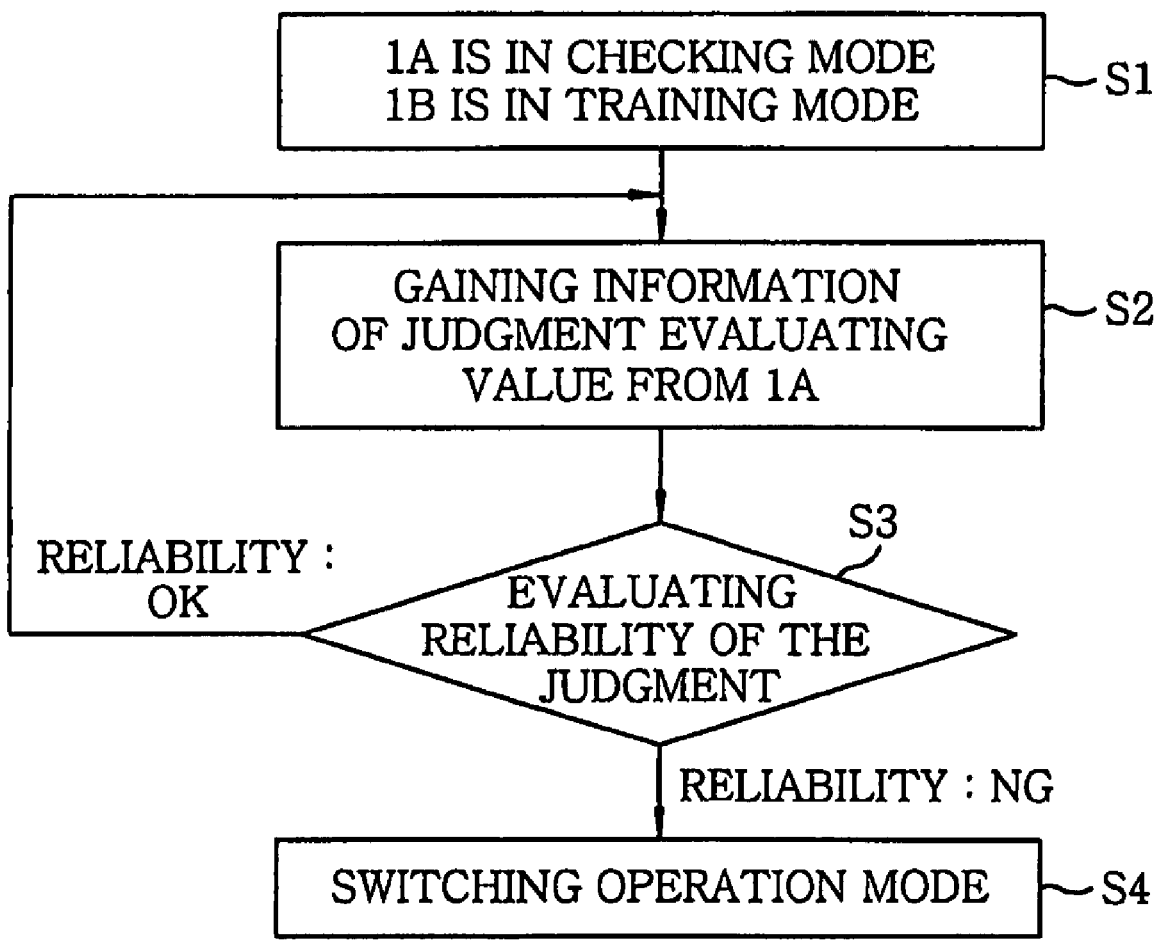
FIG. 3 describes an operation of the embodiment.

FIG. 3 summarizes an operation of the switching determining unit 4. To begin with, one of the two neural networks 1 is controlled to operate in the checking mode, and the other is controlled to operate in the training mode (S1). Here, it is assumed that, initially, the neural network 1 is operated in the checking mode, and the neural network 1 is operated in the training mode. An amount of characteristics obtained from the characteristics extraction unit 3 is given as input data to the neural network 1 operating in the checking mode, and is given as a training sample to the neural network 1 operating in the training mode. The switching determining unit 4 controls the mode switching unit 5 to select one of the neural networks 1 to be in the checking mode and the other to be the training mode. Further, the switching determining unit 4 controls the output selecting unit 6 to select the output of the neural network 1 operating in the checking more to be outputted therefrom.

In training mode, learning is performed while all the training samples are regarded as belonging to the normal categories. Further, the switching determining unit 4 gains, whenever an amount of characteristics is extracted in the characteristics extraction unit 3, information for computing the judgment evaluation value from the neural network 1 operating in the checking mode (S2). Then, reliability of the judgment result is evaluated based on the judgment evaluation value (S3). In case the judgment result becomes less reliable so that the judgment does not meet the evaluation criteria, the switching determining unit 4 controls the neural network 1 operating in the checking mode to operate in the training mode and the neural network 1 operating in the training mode to operate in the checking mode. In other word, operations of both the neural networks 1 are switched (S4). Thereafter, operation modes of the neural networks 1 are decided based on the judgment evaluation value by repeating steps S2 to S4.

In the neural network 1 operating in the checking mode, if an operation of the apparatus X varies with time, reliability of judgment result is reduced since input data deviates from the trained weight vector. Meanwhile, the neural network 1 operating in the training mode obtains training samples as the training samples of the normal categories from the apparatus X wherein the training samples reflect the operation of the apparatus X which varies with time. Therefore, if the corresponding neural network 1 is switched to be in the checking mode and performs judgments, the input data, which could not be judged "normal" by the other neural network 1 which was in the checking mode before switching, can be judged "normal" by the neural network 1 to be in the training mode after switching.

This operational process is convenient especially for an apparatus such as an air conditioner whose operation is varied as season changes. Further, only two neural networks 1 are used instead of a greater number of neuron networks trained by using training samples appropriate for the various operations of an apparatus, so that appropriate judgments can be made adaptively.

In a configuration of the embodiment aforementioned, the neural network 1 operating in the training mode treats all of the amounts of characteristics gained from the characteristics extraction unit 3 as the training sample of normal category; and all of the amounts of characteristics are also given to the neural network 1 operating in the checking mode as training samples. Thereafter, certain input data which classified into the normal categories, e.g., due to the malfunctioning of an apparatus X, may be also given as training samples. The neural networks 1 does not sensitively respond to the training sample. Moreover, even if input data not belonging to the normal categories is mixed with the input data belonging to the normal categories at a certain ratio, there is no great difference in the training result. However, the range of being judged "grey" may be possibly increased.

Figure 4:
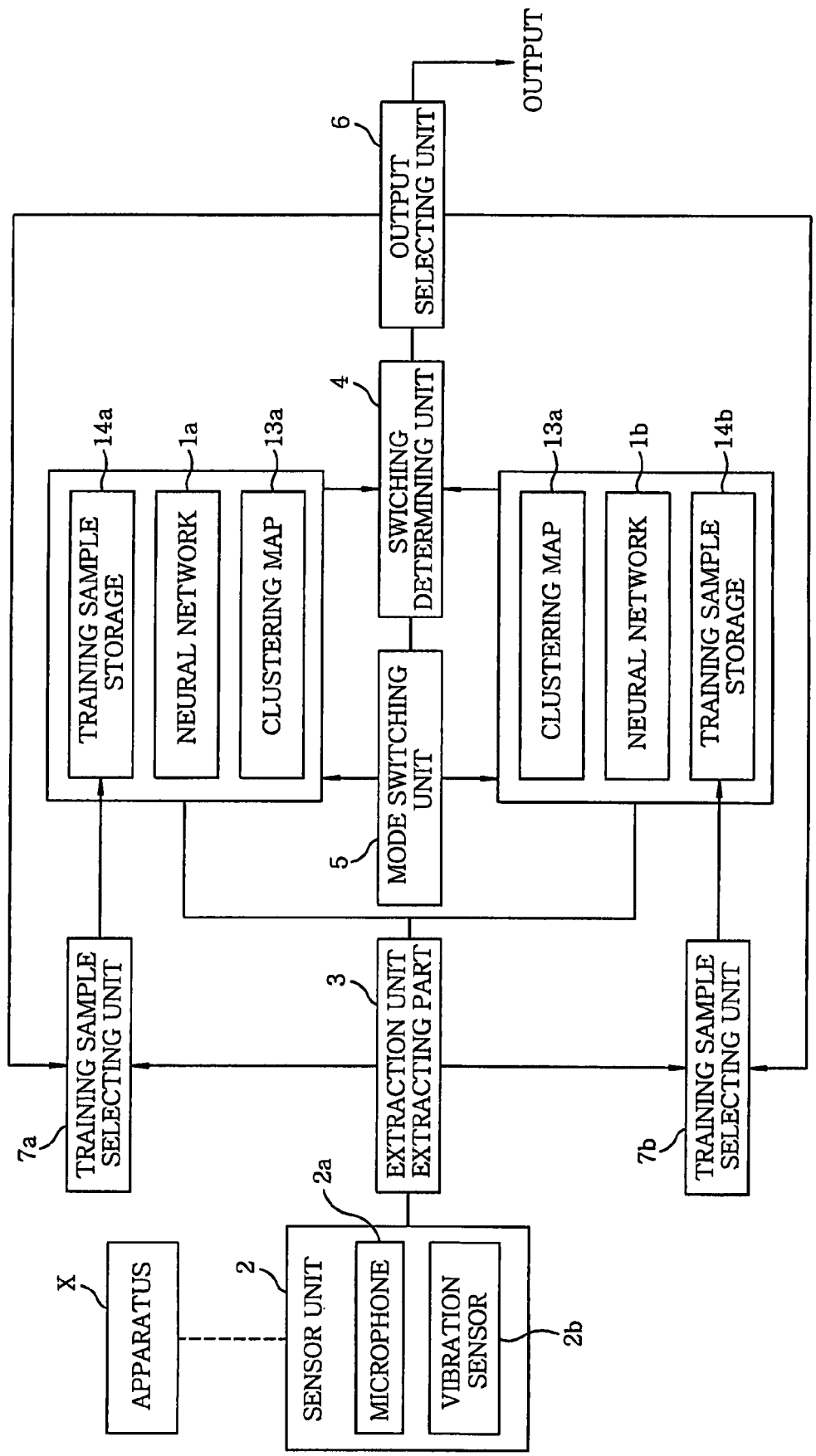
FIG. 4 is the diagram showing another embodiment of the present invention.

Therefore, as shown in FIG. 4, it is preferable that, through feedback of the judgment results obtained from the output selecting unit 6, only an amount of characteristics whose judgment results satisfies specific a determination criterion is used as a training sample. The determination criterion may be a condition that an excited neuron belongs to a normal category. Alternatively, if an excited neuron does not belong to normal categories, an amount of characteristics corresponding to the excited neuron can be prohibited from being used as a training sample. Further, the determination criterion may be a condition that a neuron belonging to a normal category is excited and the neuron has a distance greater than a specific threshold value with respect to a specific neuron in the category (for example, a neuron which has been most frequently excited in the training mode). If such condition is used as the determination criteria, it is easy to reflect operation of a variation of the apparatus X in a training sample.

For selecting an amount of characteristics to be used as a training sample among the amounts of characteristics outputted from the characteristics extraction unit 3 according to the aforementioned determination criteria, training sample selecting units 7a and 7b are respectively provided between the characteristics extraction unit 3 and the training sample storages 14. Each of the training sample selecting units 7a and 7b examines whether the judgment results of the neural networks 1, obtained from the output selecting unit 6 meet the determination criteria. If the determination criteria are satisfied, the amount of characteristics obtained from the characteristics extraction unit 3 is sent as a training sample to a training sample storage 14 of the neural network 1 operate in the training mode. The training sample selecting unit 7a or 7b corresponding to the neural network 1 operating in the training mode is selected by the switching determining unit 4.

Since a training sample to be given to the neural network 1 operating in the training mode is selected based on a judgment result of the neural network 1 operating in the checking mode, abnormal values can be removed from the training samples. Therefore, reliability of the judgment results in the checking mode can be enhanced through appropriate training.

While the invention has been shown and described with respect to the embodiments, it will be understood by those skilled in the art that various changes and modifications may be made without departing from the scope of the invention as defined in the following claims.

What is claimed is:

1. An anomaly monitoring device comprising:
   a signal input unit for receiving a target signal generated by an operation of an apparatus;
   a characteristics extraction unit for extracting an amount of characteristics having a plurality of parameters from the target signal;
   two competitive learning neural networks each of which are switchable between a training mode for learning by using amounts of characteristics extracted from the characteristics extraction unit as training samples and a checking mode for classifying based on a training result from the training mode whether or not the amount of characteristics indicates that the operation of the apparatus is normal;
   a output selecting unit for generating a classification result of the competitive learning neural networks;
   a mode switching unit for operating each competitive learning neural network in one of the training mode and the checking mode wherein the neural networks operate in modes different from each other; and
   a switching determining unit for computing a deviation (y) and a judgment evaluation value that is used in evaluating the reliability of a judgment result of the competitive learning neural network operating in the checking mode, and for instructing the mode switching unit to have said one of the competitive learning neural networks operate in the training mode and the other competitive learning neural network operate in the checking mode when the judgment evaluation value does not meet evaluation criteria.

2. The anomaly monitoring device of claim 1, wherein the switching determining unit allows the amount of characteristics to be used as a training sample for the other competitive learning neural network operating in the training mode, only when the judgment result from said one of the competitive learning neural network operating in the checking mode is normal and meets the evaluation criteria.

* * * * *